(12) United States Patent
Pimentel (10) Patent No.: US 11,219,299 B1
(45) Date of Patent: Jan. 11, 2022

(54) ELECTRONIC TABLET HOLDER ASSEMBLY

(71) Applicant: Melissa Pimentel, Fall River, MA (US)

(72) Inventor: Melissa Pimentel, Fall River, MA (US)

( * ) Notice: Subject to any disclaimer, the term of this patent is extended or adjusted under 35 U.S.C. 154(b) by 0 days.

(21) Appl. No.: 16/990,313

(22) Filed: Aug. 11, 2020

(51) Int. Cl.
*A45F 5/10* (2006.01)
*H04B 1/3888* (2015.01)
*A45F 5/00* (2006.01)

(52) U.S. Cl.
CPC .............. *A45F 5/10* (2013.01); *H04B 1/3888* (2013.01); *A45F 2005/008* (2013.01); *A45F 2005/1013* (2013.01); *A45F 2200/0516* (2013.01)

(58) Field of Classification Search
CPC ........ A45F 2005/008; A45F 2200/0516; A45F 2200/0525; H04B 2001/3861; H04B 1/3888; A45C 11/00; A45C 2011/002; A45C 2011/003; G06F 1/1626; G06F 1/1628; H04M 1/04; Y10S 224/93; F16M 13/04
USPC ................................................. 224/217–218
See application file for complete search history.

(56) References Cited

U.S. PATENT DOCUMENTS

| 4,516,774 A * | 5/1985 | Nankivell | A63B 60/40 473/518 |
| 5,421,616 A * | 6/1995 | Laubacher | B42D 3/12 281/36 |
| 7,822,449 B2 * | 10/2010 | Uramoto | H04B 1/3888 455/575.8 |
| 8,120,896 B2 * | 2/2012 | Mori | A45F 5/00 361/679.03 |
| 8,528,798 B2 * | 9/2013 | Chen | A45C 3/001 224/217 |
| 8,579,112 B2 | 11/2013 | Bethea | |
| 8,960,421 B1 * | 2/2015 | Diebel | G06F 1/1628 206/45.2 |
| 9,033,384 B2 * | 5/2015 | Potter | G06F 1/1628 294/25 |
| 9,155,377 B2 | 10/2015 | Wangercyn, Jr. | |
| 9,407,310 B2 * | 8/2016 | Lee | H04B 1/3888 |
| 9,496,909 B2 | 11/2016 | West | |
| D799,460 S | 10/2017 | Katopis | |
| 10,213,010 B2 | 2/2019 | Pearce | |
| 2006/0279098 A1 | 12/2006 | Shipley | |
| 2008/0096620 A1 * | 4/2008 | Lee | G06F 1/1686 455/575.8 |
| 2010/0296235 A1 * | 11/2010 | Takemasa | G06F 1/1616 361/679.21 |

(Continued)

FOREIGN PATENT DOCUMENTS

WO WO2019152558 8/2019

*Primary Examiner* — Adam J Waggenspack (57) ABSTRACT

An electronic tablet holder assembly for gripping an electronic tablet includes a panel that is positionable on a bottom side of an electronic tablet. A plurality of couplers is each coupled to the panel and each of the couplers releasably engages a bottom of the electronic tablet for attaching the panel to the electronic tablet. A hand strap is coupled to the panel and a user's hand is extendable therethrough to facilitate a user to grip the electronic tablet. A finger strap is coupled to the panel at a plurality of connection points to define a plurality of fingers loops. Each of the finger loops has a respective one of the user's fingers extended therethrough to enhance the user's ability to grip the electronic tablet.

8 Claims, 6 Drawing Sheets

(56) References Cited

U.S. PATENT DOCUMENTS

| | | | | |
|---|---|---|---|---|
| 2012/0043234 A1* | 2/2012 | Westrup | ............... | A45C 13/02 |
| | | | | 206/320 |
| 2012/0267402 A1* | 10/2012 | Beatty | ............... | A45F 5/00 |
| | | | | 224/218 |
| 2013/0079070 A1 | 3/2013 | Losiewicz | | |
| 2013/0270980 A1* | 10/2013 | Hsu | ............... | H05K 5/03 |
| | | | | 312/223.1 |
| 2014/0151417 A1* | 6/2014 | Gayler | ............... | A45F 5/00 |
| | | | | 224/217 |
| 2014/0216954 A1* | 8/2014 | Law | ............... | A45F 5/02 |
| | | | | 206/45.23 |
| 2014/0319190 A1* | 10/2014 | Cao | ............... | A45F 5/00 |
| | | | | 224/218 |
| 2015/0212544 A1* | 7/2015 | Chen | ............... | H04B 1/3888 |
| | | | | 361/679.41 |
| 2015/0318888 A1* | 11/2015 | Zhang | ............... | H04B 1/3888 |
| | | | | 455/575.8 |
| 2016/0106202 A1* | 4/2016 | Ford | ............... | H04N 19/50 |
| | | | | 224/267 |

\* cited by examiner

ELECTRONIC TABLET HOLDER ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to tablet holder devices and more particularly pertains to a new tablet holder device for gripping an electronic tablet.

(2) Description of Related Art Including Information Disclosed Under 37 CFR 1.97 and 1.98

The prior art relates to tablet holder devices including a smart phone case that has a plurality of finger rings which are pivotally coupled to the smart phone case. The prior art discloses a smart phone case which has an elastomeric finger loop. Additionally, the prior art discloses a band which is slidable around a hand held electronic device and which has finger loops coupled thereto for holding the hand held electronic device. The prior art discloses a disk that is attachable to a smart phone and a finger loop that is attached to the disk. The prior art discloses a smart phone case that has a hand strap coupled thereto for receiving a user's hand. The prior art also discloses a smart phone case that has finger channels integrated therein for enhancing gripping the smart phone case.

BRIEF SUMMARY OF THE INVENTION

An embodiment of the disclosure meets the needs presented above by generally comprising a panel that is positionable on a bottom side of an electronic tablet. A plurality of couplers is each coupled to the panel and each of the couplers releasably engages a bottom of the electronic tablet for attaching the panel to the electronic tablet. A hand strap is coupled to the panel and a user's hand is extendable therethrough to facilitate a user to grip the electronic tablet. A finger strap is coupled to the panel at a plurality of connection points to define a plurality of fingers loops. Each of the finger loops has a respective one of the user's fingers extended therethrough to enhance the user's ability to grip the electronic tablet.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
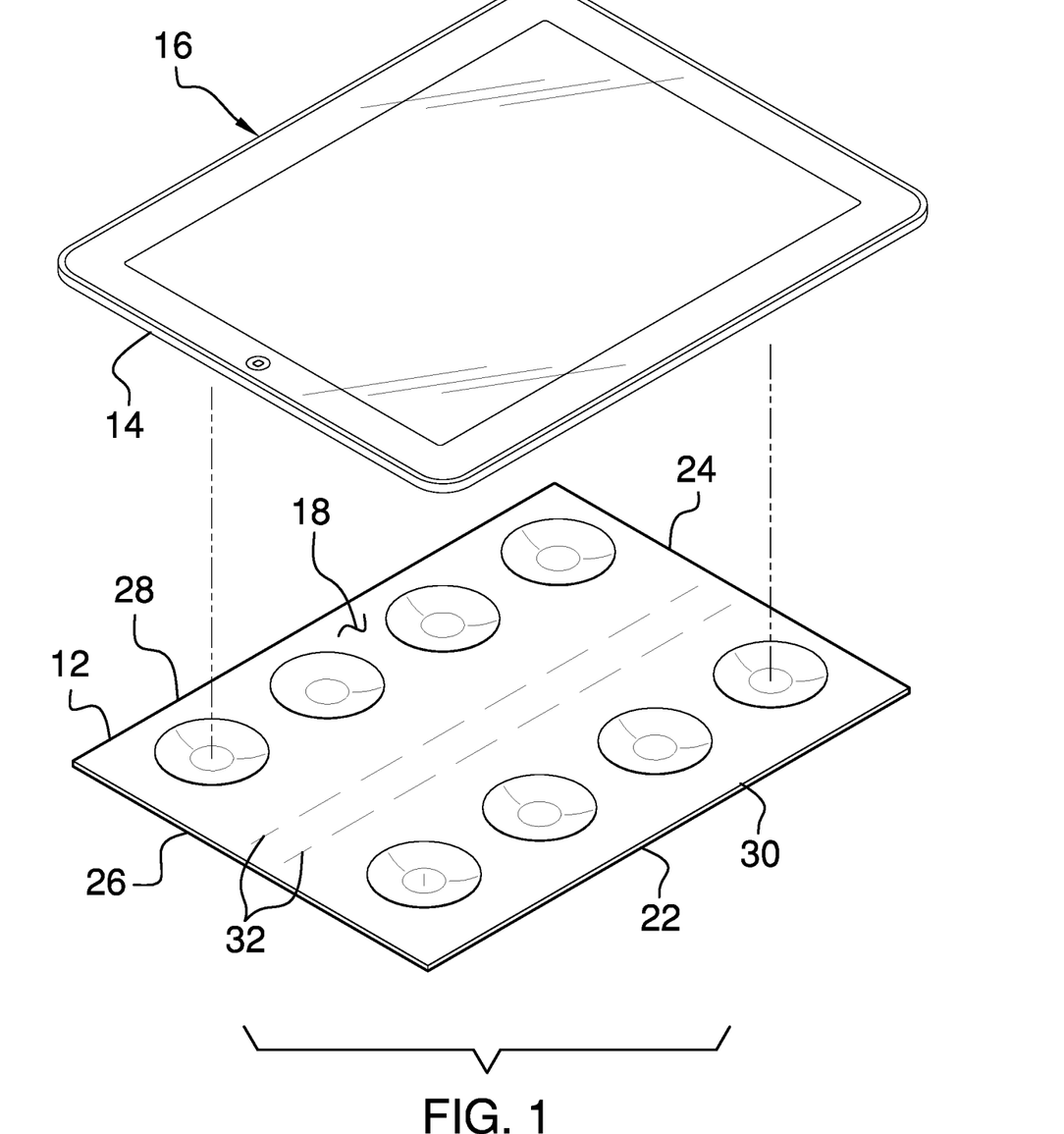
FIG. 1 is an exploded perspective view of an electronic tablet holder assembly according to an embodiment of the disclosure.
Figure 2:
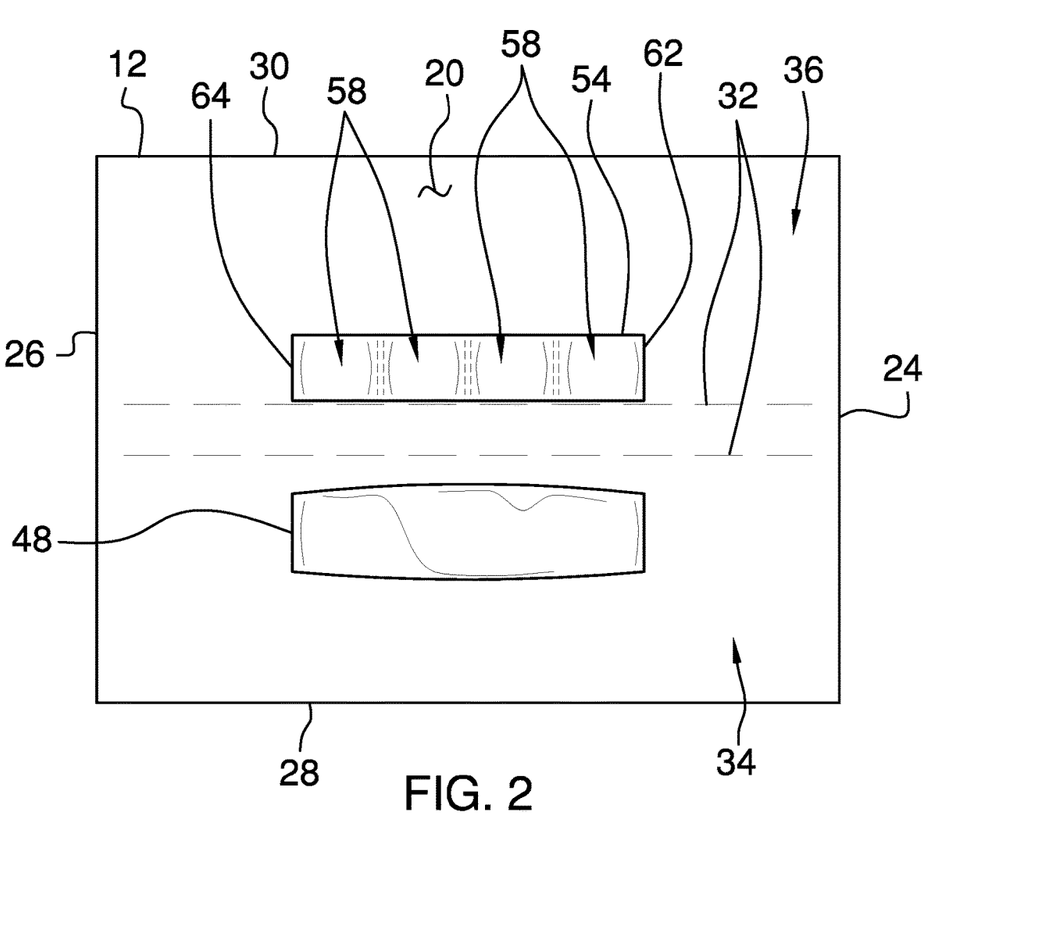
FIG. 2 is a bottom view of an embodiment of the disclosure.
Figure 3:
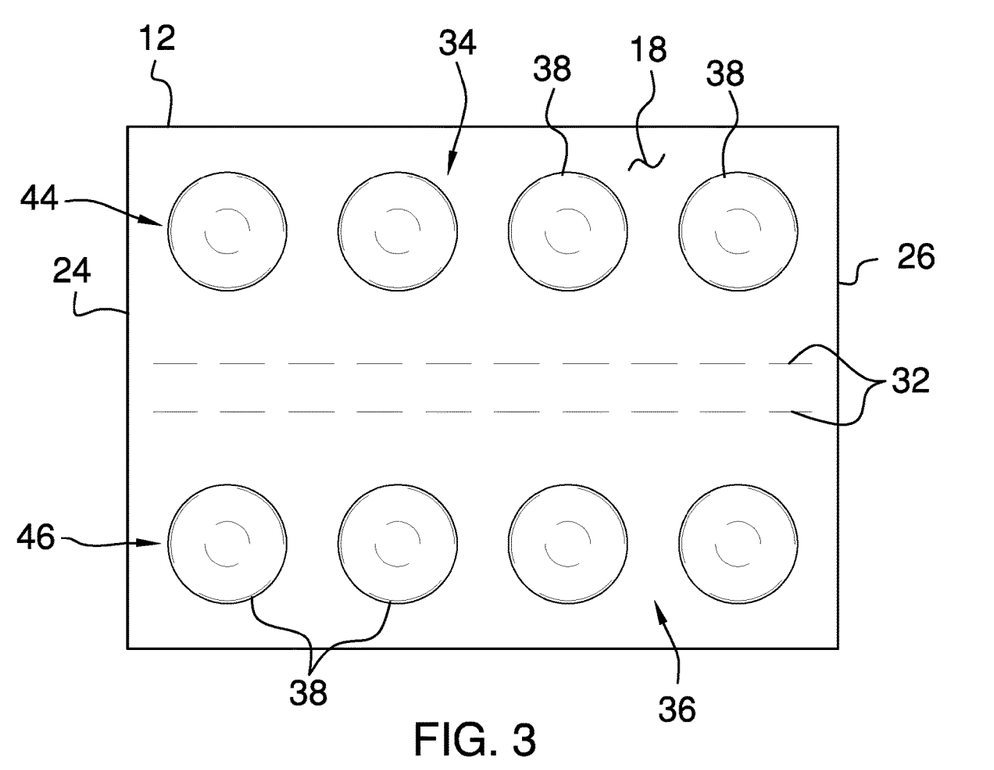
FIG. 3 is a top view of an embodiment of the disclosure.
Figure 4:
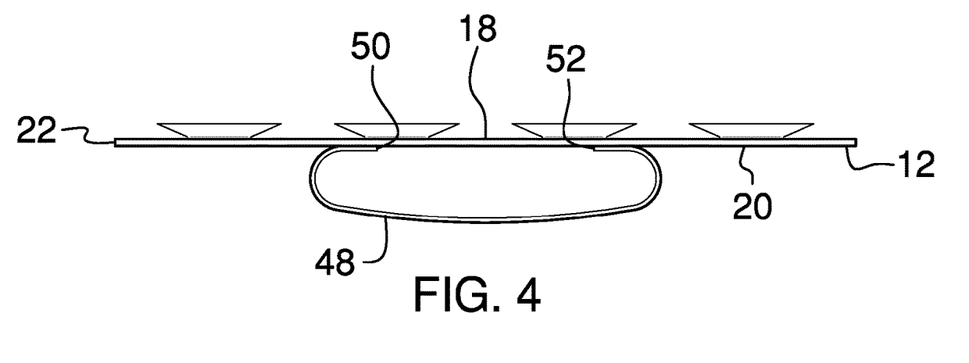
FIG. 4 is a right side view of an embodiment of the disclosure.
Figure 5:
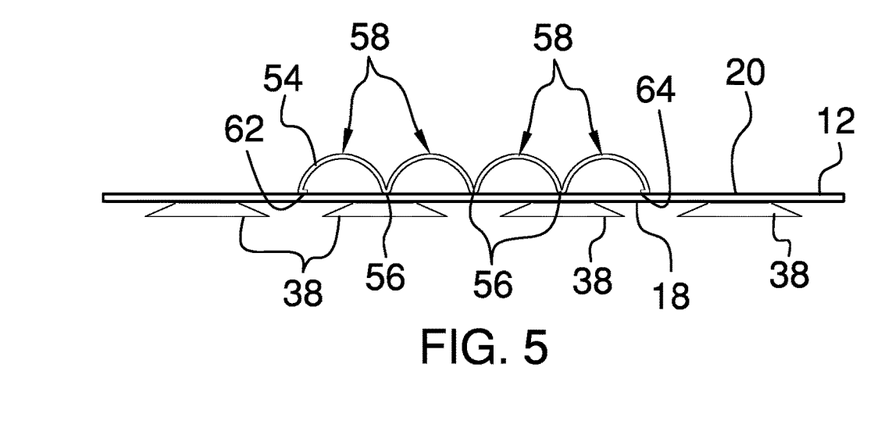
FIG. 5 is a left side view of an embodiment of the disclosure.
Figure 6:
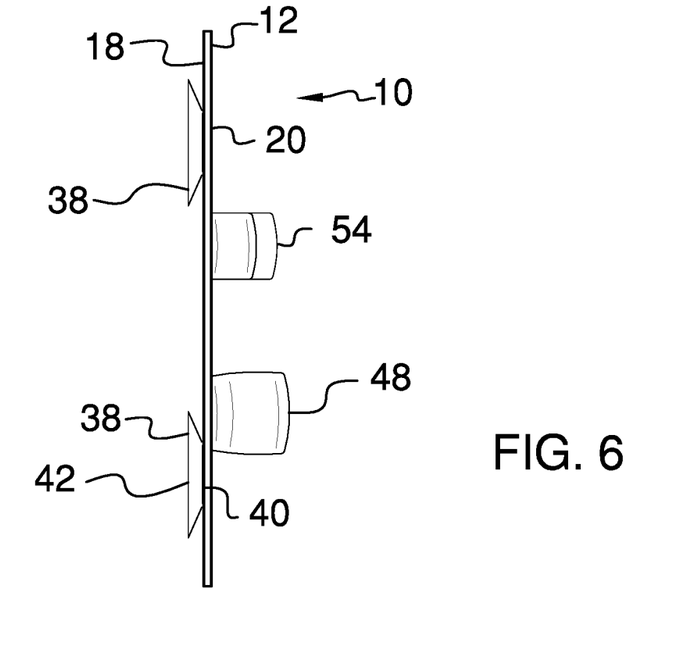
FIG. 6 is a front view of an embodiment of the disclosure.
Figure 7:
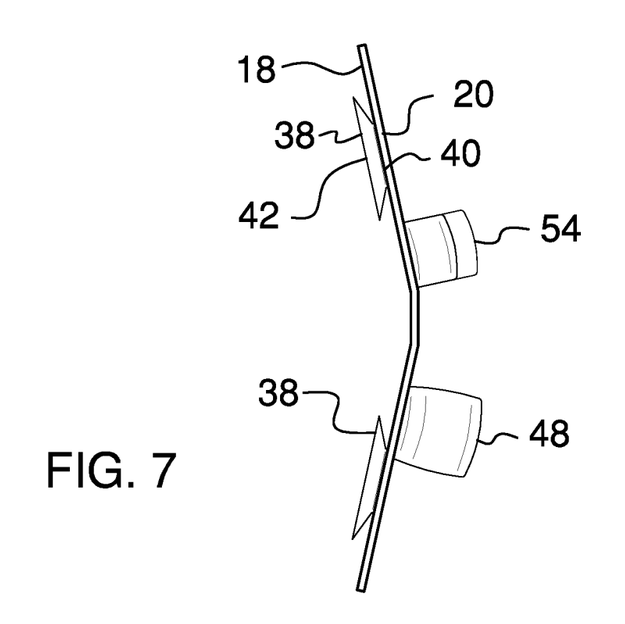
FIG. 7 is a front view of an embodiment of the disclosure showing a panel being bent along fold lines.
Figure 8:
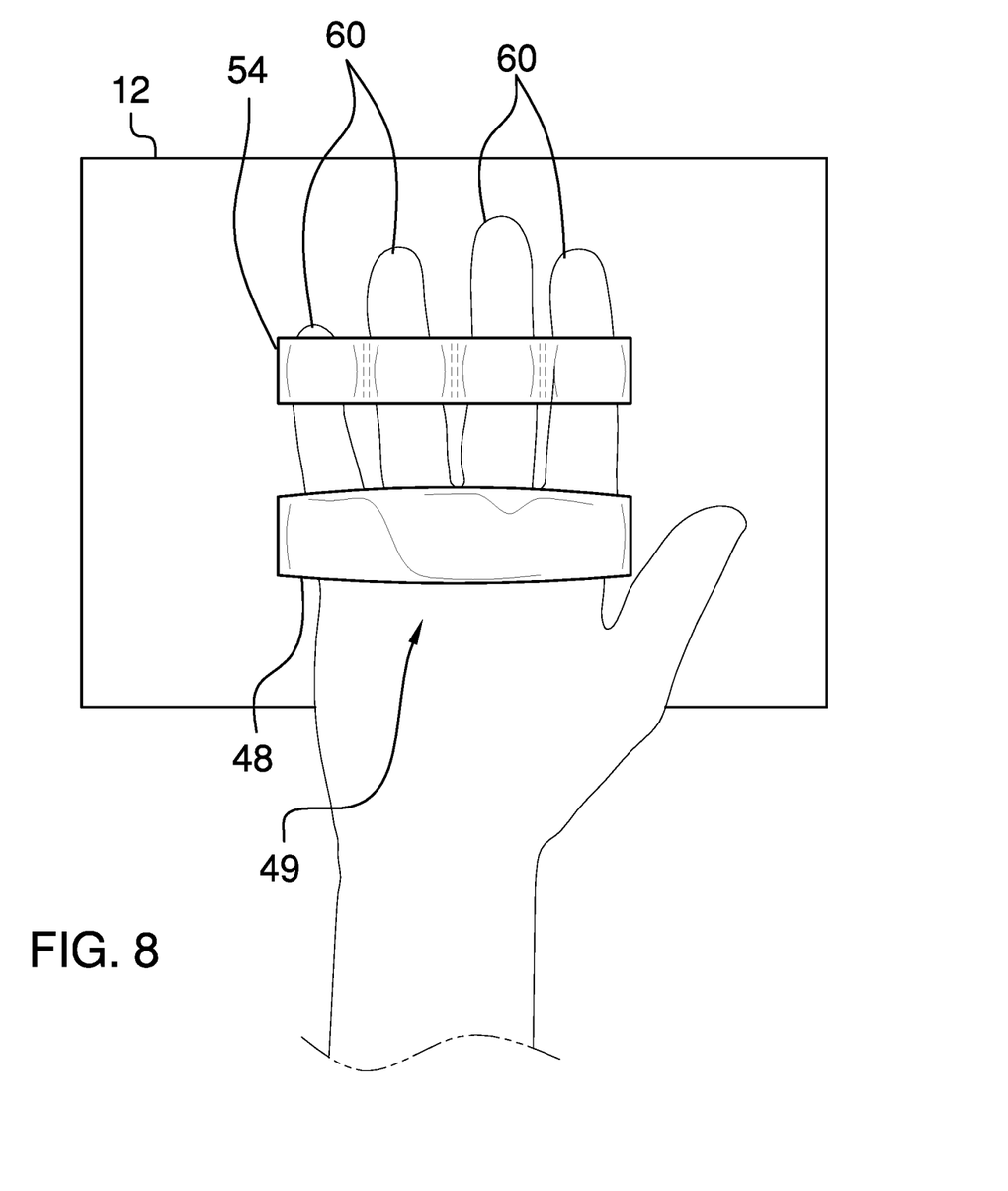
FIG. 8 is a perspective in-use view of an embodiment of the disclosure.

With reference now to the drawings, and in particular to FIGS. 1 through 8 thereof, a new tablet holder device embodying the principles and concepts of an embodiment of the disclosure and generally designated by the reference numeral 10 will be described.

As best illustrated in FIGS. 1 through 8, the electronic tablet holder assembly 10 generally comprises a panel 12 that is positionable on a bottom side 14 of an electronic tablet 16. The electronic tablet 16 may be a laptop computer, an iPad, an electronic notebook or any other planar electronic device. The panel 12 has a top surface 18, a bottom surface 20 and a perimeter edge 22 extending therebetween, and the perimeter edge 22 has a front side 24, a back side 26, a first lateral side 28 and a second lateral side 30. The panel 12 has a pair of fold lines 32 each extending between the front side 24 and the back side 26 to define a first section 34 of the panel 12 that is positionable at an angle with a second section 36 of the panel 12. Additionally, each of the fold lines 32 is centrally positioned between the first lateral side 28 and the second lateral side 30.

A plurality of couplers 38 is provided and each of the couplers 38 is coupled to the panel 12. Each of the couplers 38 releasably engages the bottom side 14 of the electronic tablet 16 thereby facilitating the panel 12 to be attached to the electronic tablet 16. Each of the couplers 38 has a first end 40 and a second end 42, and the first end 40 of each of the couplers 38 is coupled to the top surface 18 of the panel 12. Each of the couplers 38 flares outwardly between the first end 40 and the second end 42 and each of the couplers 38 is concavely arcuate between the first end 40 and the second end 42. Thus, each of the couplers 38 defines a suction cup to sectionally engage the bottom side 14 of the electronic tablet 16. The couplers 38 are spaced apart from each other and are distributed between the front side 24 and the back side 26. The plurality of couplers 38 comprises a first set of couplers 44 and a second set of couplers 46. Each of the first set of couplers 44 is positioned on the first section 34 of the panel 12 and each of the second set of couplers 46 is positioned on the second section 36 of the panel 12.

A hand strap 48 is coupled to the panel 12 and a user's hand 49 is extendable therethrough. In this way the hand strap 48 facilitates the user to grip the electronic tablet 16. The hand strap 48 has a primary end 50 and a secondary end 52, and each of the primary end 50 and the secondary end 52 is coupled to the bottom surface 20 of the panel 12 such that the hand strap 48 forms an arch on the bottom surface 20. The hand strap 48 is positioned on the first section 34 of the panel 12 and the hand strap 48 is oriented to extend along a line that extends through the front side 24 and the back side 26 of the perimeter edge 22 of the panel 12. Additionally, the hand strap 48 is spaced from the fold lines 32 on the panel 12.

A finger strap 54 is coupled to the panel 12 at a plurality of connection points 56 to define a plurality of fingers loops 58. Each of the finger loops 58 has a respective one of the user's fingers 60 being extendable therethrough to enhance the user's ability to grip the electronic tablet 16. The finger strap 54 has a primary end 62 and a secondary end 64, and each of the primary end 62 and the secondary end 64 of the finger strap 54 is coupled to the bottom surface 20 of the panel 12. The connection points 56 are spaced apart from each other and are distributed between the primary end 62 and the secondary end 64 of the finger strap 54. The finger strap 54 is positioned on the second section 36 of the panel 12 and the finger strap 54 is positioned adjacent to the fold lines 32 on the panel 12.

In use, each of the couplers 38 is mated to the bottom side 14 of the electronic tablet 16 at a location preferred by the user. The user slides their hand 49 through the hand strap 48 and each of their fingers 60 through respective finger loops 58. In this way the user can grip the electronic tablet 16 without fear of dropping the electronic tablet 16. Additionally, the fold lines 32 facilitate the panel 12 to conform to an electronic tablet 16 than can be positioned in a bent or folded position for the purposes of desktop display.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An electronic tablet holder assembly for facilitating a user to grip an electronic tablet without risking dropping the electronic tablet, said assembly comprising:
   a panel being positionable on a bottom side of an electronic tablet, wherein said panel has a top surface, a bottom surface and a perimeter edge extending therebetween, said perimeter edge having a front side, a back side, a first lateral side and a second lateral side, said panel having a pair of fold lines each extending between said front side and said back side to define a first section of said panel being positionable at an angle with a second section of said panel, each of said fold lines being centrally positioned between said first lateral side and said second lateral side;
   a plurality of couplers being coupled to said top surface of said panel, each of said couplers releasably engaging a bottom of the electronic tablet wherein said panel is configured to be attached to the electronic tablet;
   a hand strap being coupled to said bottom surface of said panel, said hand strap having a user's hand being extendable therethrough wherein said hand strap is configured to facilitate a user to grip the electronic tablet, said hand strap being positioned to one side of both of said fold lines; and
   a finger strap being coupled to said bottom surface of said panel on the opposite side of both fold lines as the hand strap at a plurality of connection points to define a plurality of fingers loops, each of said finger loops having a respective one of the user's fingers being extendable therethrough while the user's hand is positioned in the hand strap;
   wherein said finger strap is configured to enhance the user's ability to grip the electronic tablet.

2. The assembly according to claim 1, wherein each of said couplers has a first end and a second end, said first end of each of said couplers being coupled to said top surface of said panel, each of said couplers flaring outwardly between said first end and said second end, each of said couplers being concavely arcuate between said first end and said second end such that each of said couplers defines a suction cup wherein each of said couplers is configured to suctionally engage the bottom of the electronic tablet, said plurality of couplers being spaced apart from each other and being distributed between said front side and said back side.

3. The assembly according to claim 1, wherein said plurality of couplers comprises a first set of couplers and a second set of couplers, each of said first couplers being positioned on said first section of said panel, each of said second couplers being positioned on said second section of said panel.

4. The assembly according to claim 1, wherein said hand strap has a primary end and a secondary end, each of said primary end and said secondary end being coupled to said bottom surface of said panel such that said hand strap forms an arch on said bottom surface.

5. The assembly according to claim 1, wherein said hand strap is positioned on said first section of said panel, said hand strap being oriented to extend along a line extending through said front side and said back side of said perimeter edge of said panel, said hand strap being spaced from said fold lines on said panel.

6. The assembly according to claim 1, wherein said finger strap has a primary end and a secondary end, each of said primary end and said secondary end of said finger strap being coupled to said bottom surface of said panel, each of said connection points being spaced apart from each other and being distributed between said primary end and said secondary end of said finger strap.

7. The assembly according to claim 1, wherein said finger strap is positioned on said second section of said panel, said finger strap being positioned adjacent to said fold lines on said panel.

8. An electronic tablet holder assembly for facilitating a user to grip an electronic tablet without risking dropping the electronic tablet, said assembly comprising:
- a panel being positionable on a bottom side of an electronic tablet, said panel having a top surface, a bottom surface and a perimeter edge extending therebetween, said perimeter edge having a front side, a back side, a first lateral side and a second lateral side, said panel having a pair of fold lines each extending between said front side and said back side to define a first section of said panel being positionable at an angle with a second section of said panel, each of said fold lines being centrally positioned between said first lateral side and said second lateral side;
- a plurality of couplers being coupled to said panel, each of said couplers releasably engaging a bottom of the electronic tablet wherein said panel is configured to be attached to the electronic tablet, each of said couplers having a first end and a second end, said first end of each of said couplers being coupled to said top surface of said panel, each of said couplers flaring outwardly between said first end and said second end, each of said couplers being concavely arcuate between said first end and said second end such that each of said couplers defines a suction cup wherein each of said couplers is configured to suctionally engage the bottom of the electronic tablet, said plurality of couplers being spaced apart from each other and being distributed between said front side and said back side, said plurality of couplers comprising a first set of couplers and a second set of couplers, each of said first couplers being positioned on said first section of said panel, each of said second couplers being positioned on said second section of said panel;
- a hand strap being coupled to said panel, said hand strap having a user's hand being extendable therethrough wherein said hand strap is configured to facilitate a user to grip the electronic tablet, said hand strap having a primary end and a secondary end, each of said primary end and said secondary end being coupled to said bottom surface of said panel such that said hand strap forms an arch on said bottom surface, said hand strap being positioned on said first section of said panel wherein said hand strap is positioned to one side of both of said fold lines, said hand strap being oriented to extend along a line extending through said front side and said back side of said perimeter edge of said panel, said hand strap being spaced from said fold lines on said panel; and
- a finger strap being coupled to said panel at a plurality of connection points to define a plurality of fingers loops, each of said finger loops having a respective one of the user's fingers being extendable therethrough wherein said finger strap is configured to enhance the user's ability to grip the electronic tablet, said finger strap having a primary end and a secondary end, each of said primary end and said secondary end of said finger strap being coupled to said bottom surface of said panel, each of said connection points being spaced apart from each other and being distributed between said primary end and said secondary end of said finger strap, said finger strap being positioned on said second section of said panel, said finger strap being positioned adjacent to said fold lines on said panel on the opposite side of both fold lines as the hand strap, such that a user's hand and fingers can simultaneously extend through the hand strap and the finger loops, respectively.

\* \* \* \* \*